US012565871B2

(12) United States Patent
Wang et al.

(10) Patent No.: US 12,565,871 B2
(45) Date of Patent: Mar. 3, 2026

(54) MOTOR STARTER

(71) Applicant: Schneider Electric (China) Co., Ltd., Beijing (CN)

(72) Inventors: Zhibao Wang, Beijing (CN); Baoyun Bi, Beijing (CN); Xiaoqiang Li, Beijing (CN); Jiamin Chen, Beijing (CN); Junqi Xiang, Beijing (CN); Yuchun Guo, Beijing (CN); Jie Huang, Beijing (CN); Huaying Li, Beijing (CN); Kun Liu, Beijing (CN); Fangfang Wang, Beijing (CN); Zuoren Wu, Beijing (CN); Qing Yang, Beijing (CN); Qilei Zhu, Beijing (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 275 days.

(21) Appl. No.: 18/545,586

(22) Filed: Dec. 19, 2023

(65) Prior Publication Data

US 2025/0163876 A1 May 22, 2025

(30) Foreign Application Priority Data

Nov. 17, 2023 (CN) ......................... 202323115720.6

(51) Int. Cl.
*H02P 27/06* (2006.01)
*F02N 11/08* (2006.01)

(52) U.S. Cl.
CPC ...... *F02N 11/0803* (2013.01); *F02N 11/0862* (2013.01); *F02N 2011/0874* (2013.01)

(58) Field of Classification Search
CPC ........................ F02N 11/0803; H05K 7/14322
See application file for complete search history.

(56) References Cited

U.S. PATENT DOCUMENTS

2018/0301960 A1* 10/2018 Li ........................ H02K 11/215

FOREIGN PATENT DOCUMENTS

| | | |
|---|---|---|
| CN | 201504203 U | 6/2010 |
| CN | 204316384 U | 5/2015 |
| WO | 2014049731 A1 | 4/2014 |

OTHER PUBLICATIONS

Extended European Search Report dated Jul. 11, 2024 for corresponding European Patent Application No. 23217772.5-1201, 28 pages.

* cited by examiner

*Primary Examiner* — Muhammad S Islam
(74) *Attorney, Agent, or Firm* — Patterson + Sheridan, LLP

(57) ABSTRACT

Embodiments of the present disclosure provides a motor starter, the motor starter includes a housing including a base plate; power supply board disposed on the base plate; a first insulating board covering a side of the power supply board away from the base plate; a signal processing board disposed on a side of the first insulating board away from the base plate, and a first insulating part is disposed on a side of the signal processing board away from the base plate; and an interface board disposed on a side of the signal processing board away from the base plate, and a second insulating part is disposed on a side of the interface board facing the signal processing board, a second insulating board is disposed on a side of the interface board away from the signal processing board.

10 Claims, 8 Drawing Sheets

MOTOR STARTER

CROSS-REFERENCE

The present application claims priority to Chinese Patent Application No. 2023231157206, filed on Nov. 17, 2023, and entitled "MOTOR STARTER", the entirety of which is incorporated herein by reference.

FIELD

Embodiments of the present disclosure generally relates to the field of electrical equipment, and more particularly, to a motor starter.

BACKGROUND

Layout between internal assembling plates of a conventional motor starter is complex, which on one hand leads to an excessive volume of the motor starter, and on the other hand leads to an unreasonable arrangement of an internal insulating part.

Therefore, how to provide a motor starter with a compact layout and good insulation effect is an urgent technical problem to be solved.

SUMMARY

An object of the present disclosure is to provide a motor starter to at least partially solve the above problems.

In an aspect of the present disclosure, there is provided a motor starter, the motor starter comprises a housing, comprising a base plate; a power supply board, disposed on the base plate; a first insulating board, covering a side of the power supply board away from the base plate; a signal processing board, disposed on a side of the first insulating board away from the base plate, and a first insulating part is disposed on a side of the signal processing board away from the base plate; and an interface board, disposed on a side of the signal processing board away from the base plate, and a second insulating part is disposed on a side of the interface board facing the signal processing board, a second insulating board is disposed on a side of the interface board away from the signal processing board.

According to embodiments of the present disclosure, the base plate, the power supply board, the first insulating board, the signal processing board, the interface board and the second insulating board are disposed within the housing in a stacked manner, so that the internal layout of the motor starter is compact; further, the power supply board is separated from the signal processing board by the first insulating board, the first insulating part is disposed on the signal processing board, the second insulating board is disposed on the interface board, the interface board is separated from the top plate are by the second insulating board, such that the insulating effect is improved.

In some embodiments, the base plate comprises a heat-dissipating plate.

In some embodiments, the power supply board comprises a first power supply board, a second power supply board and a third power supply board arranged along an extension direction of the first insulating board, and the first power supply board, the said second power supply board and the third power supply board are electrically connected to the signal processing board.

In some embodiments, a connecting hole is disposed on the first insulating board, and a connecting member of the signal processing board passes through the connecting hole and is electrically connected to the first power supply board, the second power supply board and the third power supply board, respectively.

In some embodiments, a third insulating part is disposed on a side of the first power supply board adjacent to the second power supply board, a side of the second power supply board adjacent to the third power supply board, and a side of the third power supply board away from the second power supply board.

In some embodiments, the housing further comprises a top plate disposed opposite to the base plate and a first side plate and a second side plate disposed opposite to each other between the base plate and the top plate, and the base plate, the top plate, the first side plate and the second side plate enclose a mounting cavity, the motor starter further comprises an operating portion and a wiring portion, wherein the operating portion and the wiring portion are disposed at both ends of the mounting cavity.

In some embodiments, vents are respectively disposed on the first side plate and the second side plate, respectively, the power supply board, the first insulating board, the signal processing board and the interface board are arranged sequentially along a direction from the base plate to the top plate.

In some embodiments, the base plate and the top plate are perpendicular to the first side plate, respectively.

In some embodiments, the motor starter further comprises an isolating switch located within the mounting cavity and adjacent to the operating portion, the wiring portion comprises a line-incoming end and a line-outgoing end, the line-incoming end is electrically connected to the isolating switch, the isolating switch is electrically connected to the power supply board, the power supply board is electrically connected to the line-outgoing end.

In some embodiments, the motor starter further comprises a human-machine interface board located within the mounting cavity and adjacent to the operating portion, the human-machine interface board is closer to the operating portion relative to the isolating switch, and the human-machine interface board is electrically connected to the operating portion.

It should be understood that the contents described in this section are not intended to limit critical or important features of the embodiments of the present disclosure, nor are they intended to limit the scope of the present disclosure. Other features of the present disclosure will become easier to be understood from the following description.

BRIEF DESCRIPTION OF THE DRAWINGS

The above and other features, advantages and aspects of various embodiments of the present disclosure will become more apparent in conjunction with the accompanying drawings and with reference to the following detailed description. In the drawings, like or similar reference numerals denote like or similar elements, wherein.

DESCRIPTION OF REFERENCE SIGNS

Figure 1:
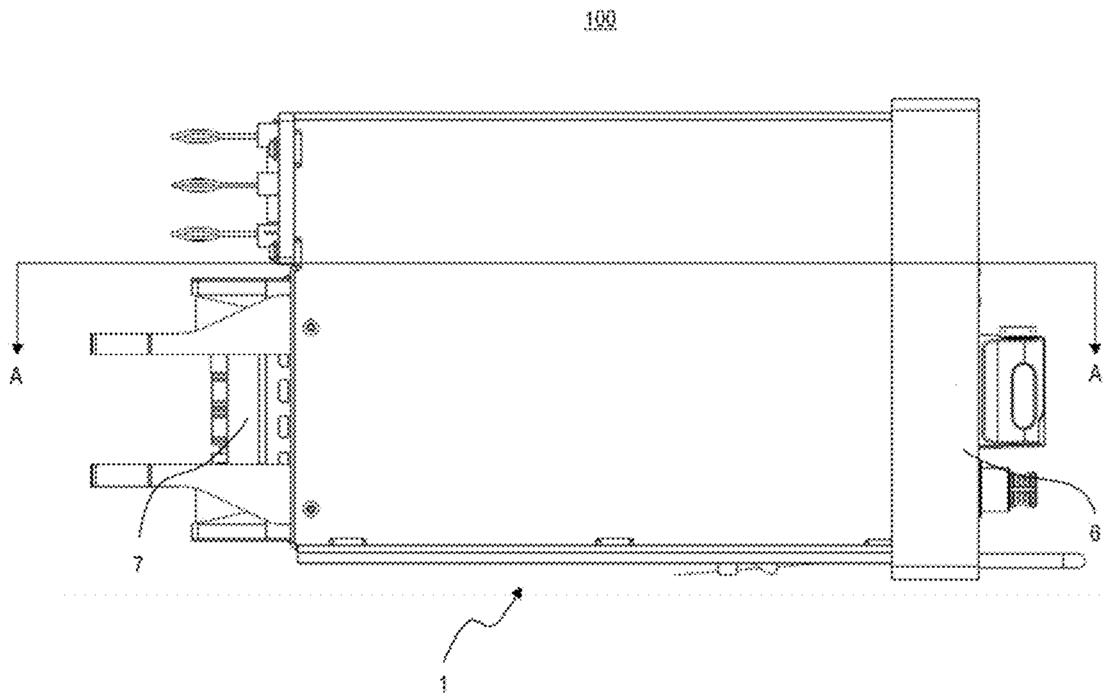
FIG. 1 shows a schematic structural diagram of a motor starter according to some embodiments of the present disclosure.

100 is the motor starter, 101 is the mounting cavity;

1 is a housing, 11 is a base plate, 12 is a top plate, 13 is a first side plate, 131 is a mounting part, 14 is a second side plate, 15 is a vent;

2 is a power supply board, 21 is a first power supply board, 211 is a first input part, 212 is a first output part, 22 is a second power supply board, 221 is a second input part, 222 is a second output part, 23 is a third power supply board, 231 is a third input part, 232 is a third output part, 24 is a third insulating part;

3 is a first insulating board, 31 is a connecting hole;

4 is a signal processing board, 41 is a first insulating part, 42 is a first network port, 43 is a second network port, 44 is a fifth wiring part, 45 is a sixth wiring part, 46 is a seventh wiring part, 47 is an eighth wiring part, and 48 is a ninth wiring part;

5 is an interface board, 51 is a second insulating part, 52 is a second insulating board, 53 is a first wiring part, 54 is a second wiring part, 55 is a third wiring part, 56 is a fourth wiring part, and 57 is a sampling interface;

6 is an operating portion, 61 is a rotating button, 62 is a display panel;

7 is a wiring portion, 71 is a line-incoming end, 711 is a first line-incoming end, 712 is a second line-incoming end, 713 is a third line-incoming end, 72 is a line-outgoing end, 721 is a first line-outgoing end, 722 is a second line-outgoing end, and 723 is a third line-incoming end;

8 is an isolating switch, 81 is a first contact, 82 is a second contact, and 83 is a third contact;

9 is a human-machine interface board.

DETAILED DESCRIPTION

Preferred embodiments of the present disclosure will be described in more detail below with reference to the accompanying drawings. Although the preferred embodiments of the present disclosure are shown in the drawings, it should be understood that the present disclosure can be implemented in various forms and should not be limited by the embodiments set forth herein. Instead, these embodiments are provided to make the present disclosure more thorough and complete, and to fully convey the scope of the present disclosure to those skilled in the art.

The term "including" and its variations used in this article indicate open inclusion, that is, "including but not limited to". Unless otherwise stated, the term "or" means "and/or". The term "based on" means "at least partially based on". The terms "one example embodiment" and "one embodiment" mean "at least one example embodiment". The term "another embodiment" means "at least one additional embodiment". The terms "first", "second", etc. can refer to different or identical objects.

As described above, the layout between the internal assembling plates of the conventional motor starter is complex, which on one hand leads to an excessive volume of the motor starter, and on the other hand leads to an unreasonable arrangement of an internal insulating part. The embodiments of the present disclosure provide a motor starter 100 with a compact layout and good insulation effect. Hereinafter, the principles of the present disclosure will be described in conjunction with FIGS. 1 to 10.

Figure 2:
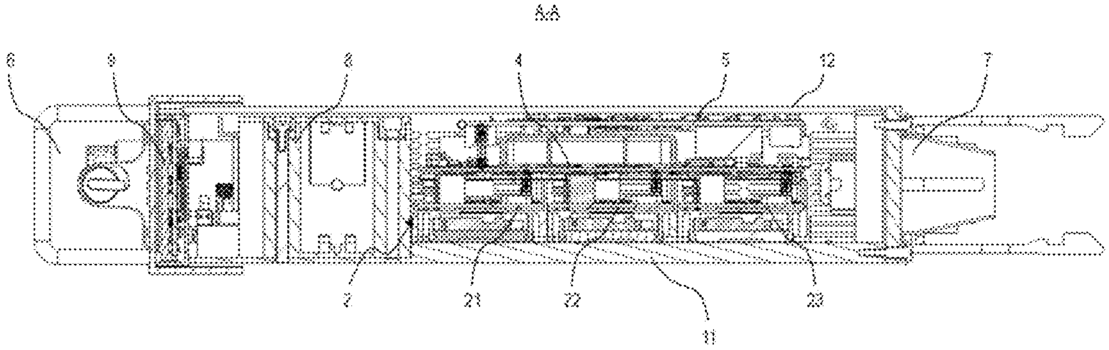
FIG. 2 shows a cross-sectional view taken along A-A of the motor starter shown in FIG. 1.
Figure 3:
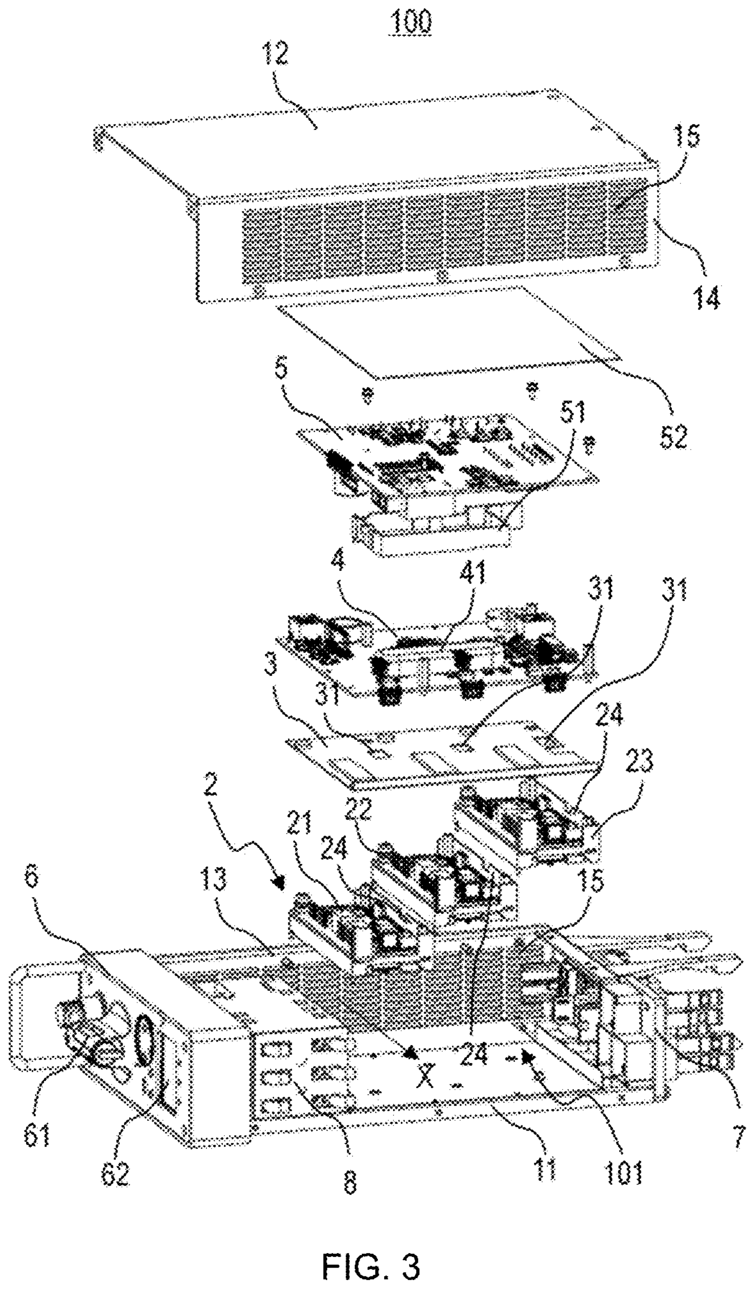
FIG. 3 shows an exploded view of the motor starter shown in FIG. 1.

FIG. 1 shows a schematic structural diagram of a motor starter 100 according to some embodiments of the present disclosure. FIG. 2 shows a cross-sectional view taken along A-A of the motor starter shown in FIG. 1. FIG. 3 shows an exploded view of the motor starter 100 shown in FIG. 1. As shown in FIGS. 1 to 3, the motor starter 100 described herein generally includes a housing 1, a power supply board 2, a first insulating board 3, a signal processing board 4, an interface board 5, an operating portion 6, a wiring portion 7, an isolating switch 8, and a human-machine interface board 9. The housing 1 serves as an installation carrier, and has a mounting cavity 101 for installing the power supply board 2, the first insulating board 3, the signal processing board 4, the interface board 5, the isolating switch 8, and the human-machine interface board 9.

Continuing to refer to FIGS. 1 to 3, the housing 1 may include a base plate 11, a top plate 12, a first side plate 13 and a second side plate 14, wherein the base plate 11 and the top plate 12 are disposed opposite to each other, and the first side plate 13 and the second side plate 14 are disposed opposite to each other between the base plate 11 and the top plate 12. The base plate 11, the top plate 12, the first side plate 13 and the second side plate 14 enclose the mounting cavity 101, and the operating portion 6 and the wiring portion 7 are disposed at both ends of the mounting cavity 101, respectively. Therefore, an overall outline of the motor starter 100 is formed. Return to FIG. 1, a mounting part 131 may be disposed on the first side plate 13 to fix the motor starter 100 in a cabinet.

Continuing to refer to FIGS. 2 to 3, the power supply board 2 is disposed on the base plate 11. The first insulating board 3 covers a side of the power supply board 2 away from the base plate 11. The signal processing board 4 is disposed on a side of the first insulating board 3 away from the base plate 11, and the first insulating part 41 is disposed on a side of the signal processing board 4 away from the base plate 4. The interface board 5 is disposed on a side of the signal processing board 4 away from the base plate 11, and the second insulating part 51 is disposed on a side of the interface board 5 facing the signal processing board 4, the second insulating board 52 is disposed on a side of the interface board 5 away from the signal processing board 4. Accordingly, the base plate 11, the power supply board 2, the first insulating board 3, the signal processing board 4, the interface board 5 and the second insulating board 52 are disposed in the housing 1 in a stacked manner.

With the above configuration, the base plate 11, the power supply board 2, the first insulating board 3, the signal processing board 4, the interface board 5 and the second insulating board 52 are disposed within the housing 1 in a stacked manner, so that the internal layout of the motor starter 100 is compact; further, the power supply board 2 is separated from the signal processing board 4 by the first insulating board 3, the first insulating part 41 is disposed on the signal processing board 4, the second insulating board 52 is disposed on the interface board 5, the interface board 5 is separated from the top plate 12 the second insulating board 51, such that the insulating effect is improved.

Continuing to refer to FIGS. 2 to 3, in some embodiments, the base plate 11 may include a heat-dissipating plate. Therefore, embodiments of the present disclosure further reduce the volume of the motor starter 100 by using the heat-dissipating plate as a part of the housing 1, without need for disposing additional heat-dissipating structures to on the housing 1.

Figure 4:
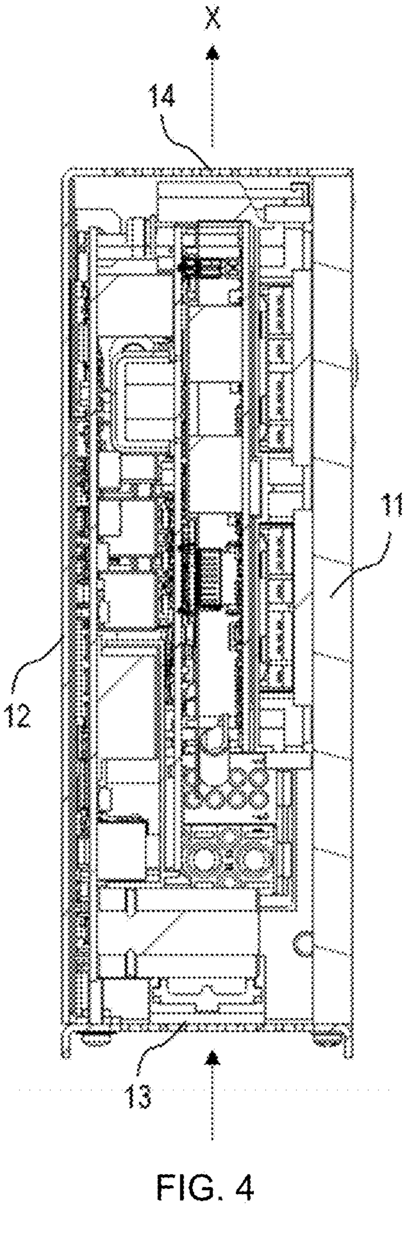
FIG. 4 shows a side view of the motor starter shown in FIG. 1.

FIG. 4 shows a side view of the motor starter 100 shown in FIG. 1. Referring to FIGS. 3 to 4, in some embodiments, vents 15 may be disposed on the first side plate 13 and the second side plate 14, respectively, to facilitate gas flow. The power supply board 2, the first insulating board 3, the signal processing board 4, the interface board 5, and the second insulating board 51 are arranged sequentially along a direction from the base plate 11 to the top plate 12. With the above configuration, gas enters from the vent 15 on the first side plate 13 and then flows out from the vent 15 of the second side plate 14. Since the power supply board 2, the first insulating board 3, the signal processing board 4, the interface board 5, and the second insulating board 51 are arranged sequentially along a direction from the base plate 11 to the top plate 12, the heat-dissipating effect of the motor starter 100 is improved.

Continuing to refer to FIGS. 3 to 4, the base plate 11 and the top plate 12 may be perpendicular to the first side plate 13, respectively. Of course, the base plate 11 and the top plate 12 are also perpendicular to the second side plate 14. The power supply board 2, the first insulating board 3, the signal processing board 4, the interface board 5, and the second insulating board 51 are parallel to the flow direction of the airflow. Therefore, the heat-dissipating effect of the motor starter 100 is significantly improved.

Specifically, as shown in FIGS. 3 to 4, the power supply board 2 serves as an electronic switch and can be used to control on-off of the circuit. The power supply board 2 may include a first power supply board 21, a second power supply board 22, and a third power supply board 23. The first power supply board 21, the second power supply board 22, and the third power supply board 23 can be electrically connected to the signal processing board 4 to control the on-off of each power supply board through the signal processing board 4. With the above configuration, the power supply board 2 includes three independent single-phase modules. Therefore, compared with processing and manufacturing the power supply board 2 as a whole, it is more convenient to divide it into three parts for processing and manufacturing. In addition, the three-part power supply board is beneficial to the insulation design among each other.

It should be noted that the first power supply board 21, the second power supply board 22, and the third power supply board 23 have the same structure. In some embodiments, the first power supply board 21, the second power supply board 22, and the third power supply board 23 can be arranged sequentially along an extension direction of the first insulating board 3. In other embodiments, the first power supply board 21, the second power supply board 22, and the third power supply board 23 can be arranged arbitrarily without distinguishing the relative positions of the first power supply board 21, the second power supply board 22, and the third power supply board 23.

Continuing to refer to FIG. 3, a third insulating part 24 is disposed on a side of the first power supply board 21 adjacent to the second power supply board 22, thereby achieving isolation between the first power supply board 21 and the second power supply board 22. A third insulating part 24 is disposed on a side of the second power supply board 22 adjacent to the third power supply board 23, thereby achieving isolation between the second power supply board 22 and the third power supply board 23. A third insulating part 24 is disposed on a side of the third power supply board 23 away from the second power supply board 22, thereby achieving isolation between the third power supply board 23 and the housing 1.

Continuing to refer to FIG. 3, in some embodiments, a connecting hole 31 is disposed on the first insulating board 3, and the number of the connecting holes 31 is three. A connecting member of the signal processing board 4 passes through the connecting hole 31 and is electrically connected to a connecting member of the first power supply board 21, a connecting member of the second power supply board 22, and a connecting member of the third power supply board 23, respectively. Therefore, the signal processing board 4 can be isolated from the three power supply boards by the first insulating board 3 to avoid signal interference; in addition, the distance between the signal processing board 4 and the power supply board 2 can be shortened by the first insulating board 3, so that the internal layout of the motor starter 100 is more compact and the volume of the motor starter 100 is reduced.

Referring back to FIGS. 2 to 3, MOS transistors are disposed on a side of the first power supply board 21 away from the signal processing board 4, a side of the second power supply board 22 away from the signal processing board 4, and a side of the third power supply board 23 away from the signal processing board 4. The MOS transistors mainly realize the function of an electronic switch and realizes opening and closing of the circuit through the opening and closing of the MOS transistor. A heat-dissipating part is disposed on a side of each MOS transistor away from the signal processing board 4, and the heat-dissipating part is connected to the base plate 11 for cooling the MOS transistor.

Continuing to refer to FIG. 3, in some embodiments, an isolating switch 8 may be disposed in the mounting cavity 101. The isolating switch 8 is adjacent to the operating portion 6, and the isolating switch 8 takes a primary wiring. The isolating switch 8 is connected in series with the power supply board 2. Apparently, the isolating switch 8 acts as a mechanical switch, the power supply board 2 acts as an electronic switch, and the isolating switch 8 and the power supply board 2 jointly control the on-off of the circuit. Specifically, the line-incoming end 71 of the wiring portion 7 is electrically connected to the power supply. An end of the isolating switch 8 is electrically connected to the line-incoming end 71 of the wiring portion 7, and the other end of the isolating switch 8 is electrically connected to an input part of the power supply board 2. An output part of the power supply board 2 is electrically connected to the line-outgoing end 72 of the wiring portion 7, and the line-outgoing end 72 of the wiring portion 7 is electrically connected to a load device.

Figure 5:
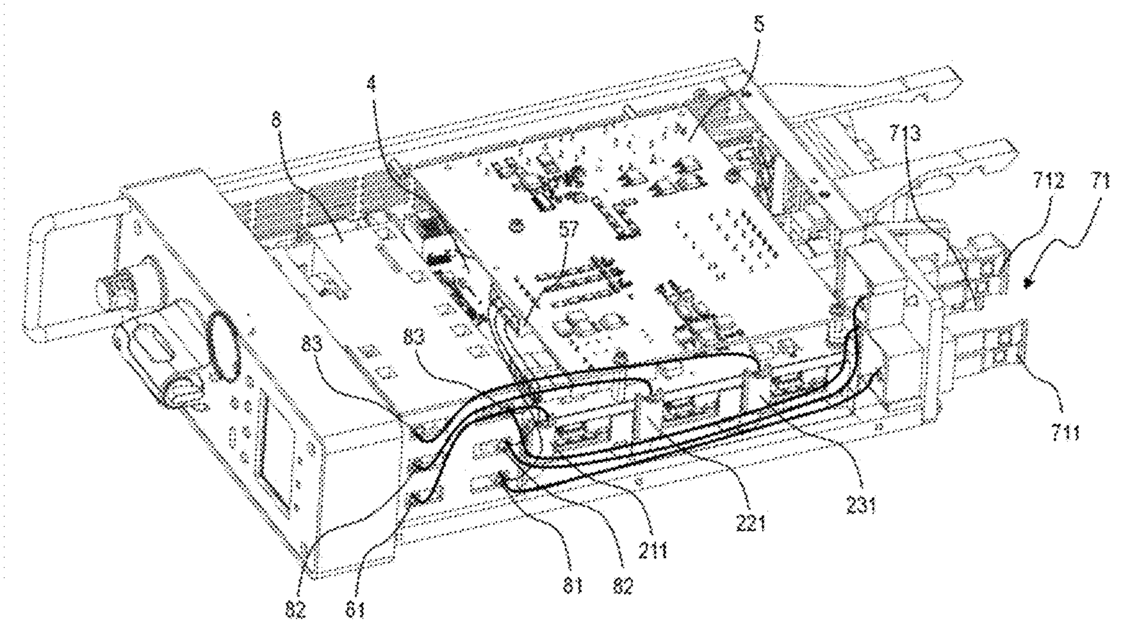
FIGS. 5 to 10 shows a schematic diagram of an internal structure of the motor starter according to some embodiments of the present disclosure.
Figure 6:
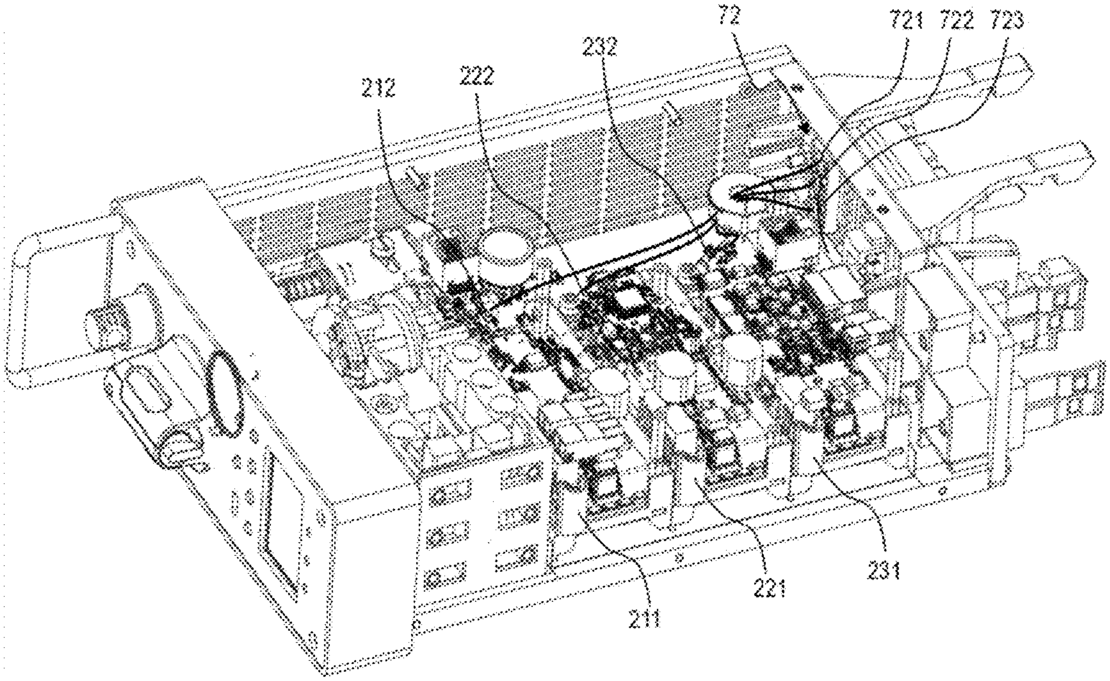

FIGS. 5 to 10 shows a schematic diagram of an internal structure of the motor starter 100 according to some embodiments of the present disclosure. As shown in FIGS. 5 to 6, in a case that the power supply board 2 includes the first power supply board 21, the second power supply board 22, and the third power supply board 23, the line-incoming end 71 includes a first line-incoming end 711, a second line-incoming end 712, and a third line-incoming end 713, the line-outgoing end 72 includes a first line-outgoing end 721, a second line-outgoing end 722, and a third line-outgoing end 723, a pair of first contacts 81, a pair of second contacts 82, and a pair of third contacts 83 are disposed on the isolating switch 8, and a first input part 211 and a first output part 212 are disposed on the first power supply board 21, a second input part 221 and a second output part 222 are disposed on the second power supply board 22, and a third input part 231 and a third output part 232 are disposed on the third power supply board 23.

Further, continuing to refer to FIGS. 5 to 6, the first line-incoming end 711, the second line-incoming end 712, and the third line-incoming end 713 are electrically connected to the power supply, respectively, so the first line-outgoing end 721, the second line-outgoing end 722, and the third line-incoming end 723 are electrically connected to the load device, respectively. The first line-incoming end 711 is electrically connected to one of the pair of first contacts 81, the other one of the pair of first contacts 81 is electrically connected to the first input part 211 of the first power supply board 21, and the first output part 212 of the first power supply board 21 is electrically connected to the first line-outgoing end 721, thereby constituting a first single-phase circuit. Similarly, the second line-incoming end 712 is electrically connected to one of the pair of second contacts 82, the other one of the pair of second contacts 82 is electrically connected to the second input part 221 of the second power supply board 22, the second output part 222 of the second power supply board 22 is electrically connected to the second line-outgoing end 722, thereby constituting a second single-phase circuit. Similarly, the third line-incoming end 713 is electrically connected to one of the pair of third contacts 83, the other of the pair of third contacts 83 is electrically connected to the third input part 231 of the third power board supply 23, and the third output part 232 of the third power supply board 23 is electrically connected to the third line-outgoing end 723, thereby constituting a third single-phase circuit.

Figure 7:
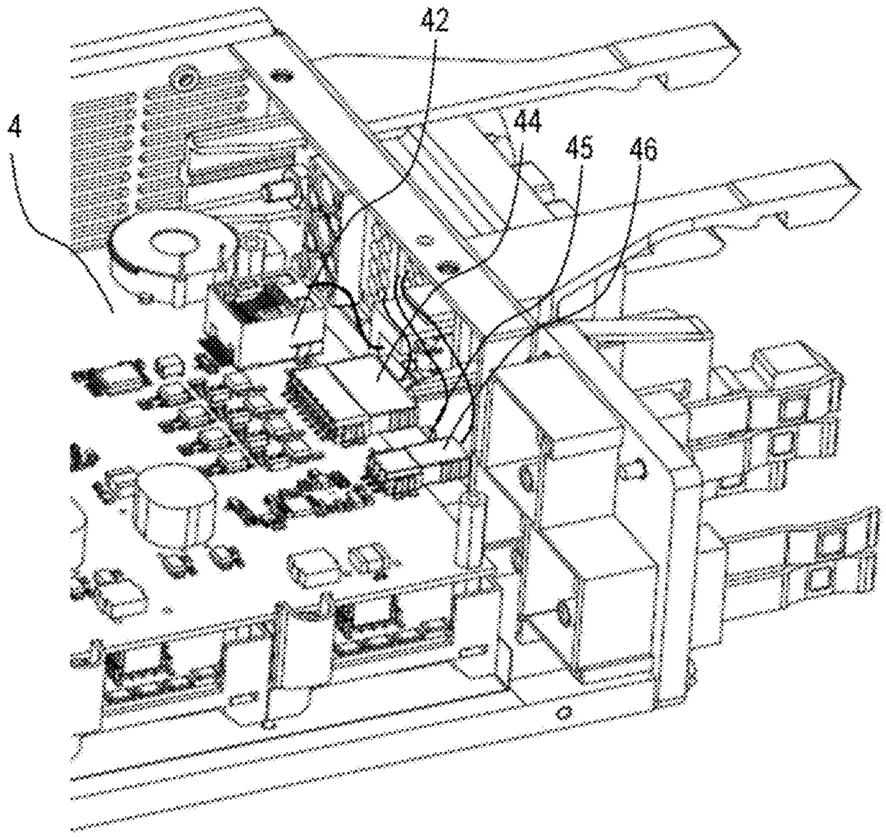
Figure 9:
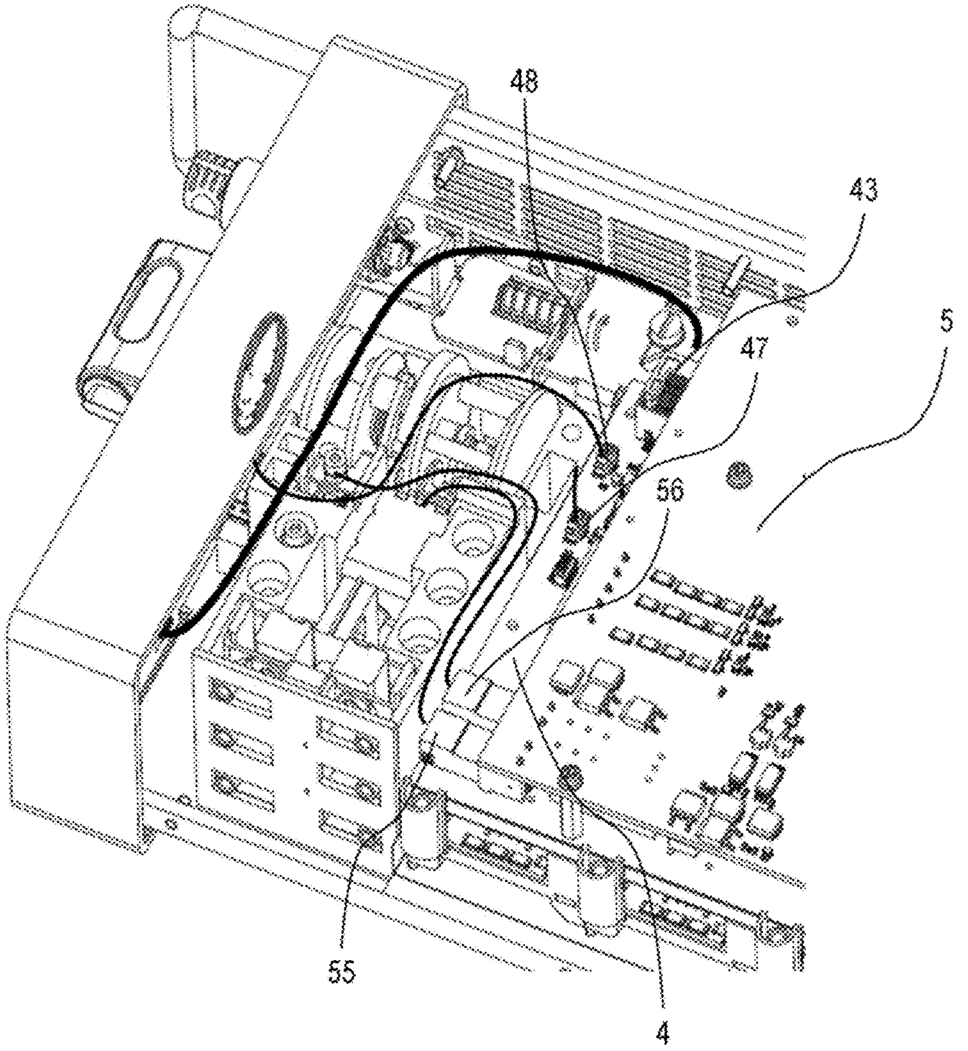
Figure 10:
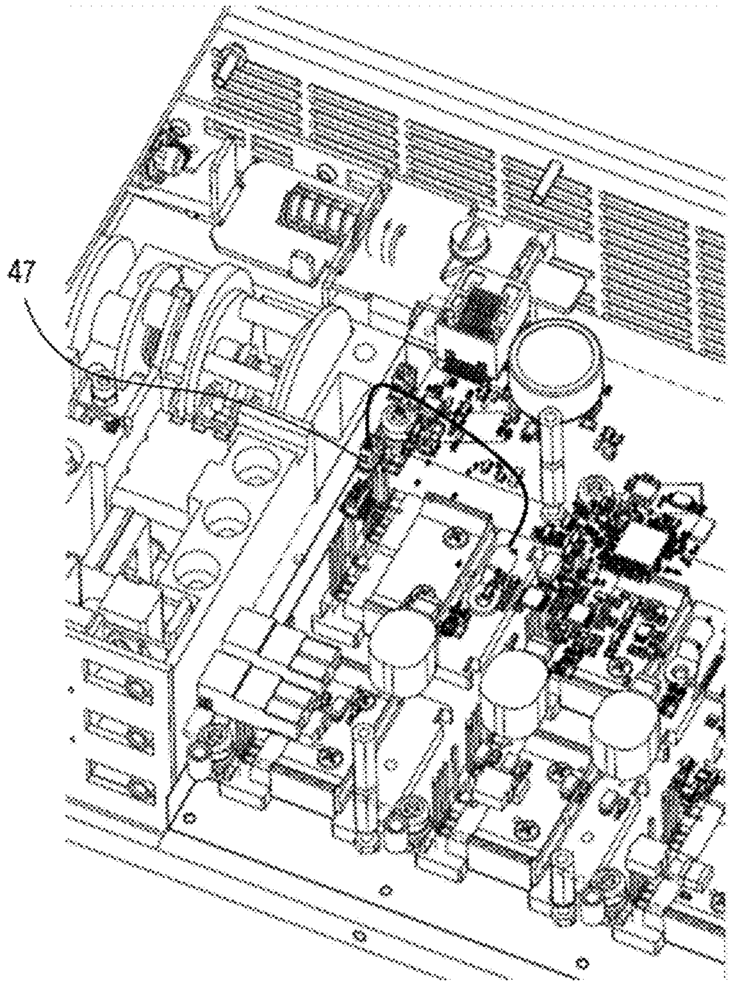

In some embodiments, the signal processing board 4 is mainly used for signal processing, and the interface board 5, the human-machine interface board 9, and the power supply board 2 are electrically connected to the signal processing board 4, respectively. A first network port 42, a second network port 43, a fifth wiring part 44, a sixth wiring part 45, a seventh wiring part 46, an eighth wiring part 47, and a ninth wiring part 48 may be disposed on the signal processing board 4, respectively, wherein the first network port 42, the second network port 43, the fifth wiring part 44, the sixth wiring part 45, the seventh wiring part 46, the eighth wiring part 47, and the ninth wiring part 48 all adopt secondary wiring. As shown in FIG. 7, the first network port 42, the fifth wiring part 44, the sixth wiring part 45, and the seventh wiring part 46 can be adjacent to the wiring portion 7, and the network cable connected to the first network port 42, a wiring cable connected to the fifth wiring part 44, the wiring cable connected to the sixth wiring part 45, and a wiring cable connected to the seventh wiring part 46 can extend to outside of the wiring portion 7. As shown in FIGS. 9 to 10, the second network port 43, the eighth wiring part 47, and the ninth wiring part 48 can be adjacent to the operating portion 6. The network cable connected to the second network port 43 can be connected to the human-machine interface board 9. A wiring cable connected to the eighth wiring part 47 can be connected to a heat sink on the power supply board 2 to detect the temperature of the MOS transistor and the heat sink. A wiring cable connected to the ninth wiring part 48 may be connected to a microswitch, wherein the microswitch is arranged adjacent the operating portion 6 of the rotating button 61, the microswitch can detect whether the rotating button 61 is in an opened position or a closed position.

Figure 8:
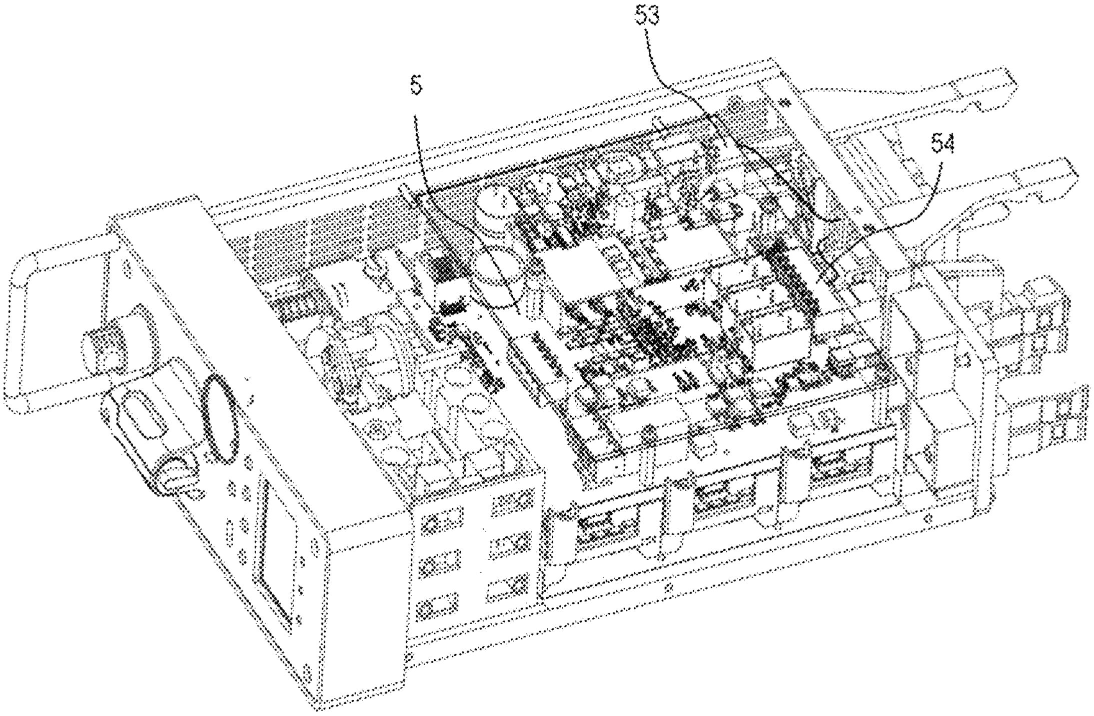

In some embodiments, a first wiring part 53, a second wiring part 54, a third wiring part 55, a fourth wiring part 56, and a sampling interface 57 may be disposed on the interface board 5, respectively. The first wiring part 53, the second wiring part 54, the third wiring part 55, the fourth wiring part 56, and the sampling interface 57 all adopt secondary wiring. As shown in FIG. 8, the first wiring part 53 and the second wiring part 54 can be adjacent to the wiring portion 7. The wiring cable connected to the first wiring part 53 and the wiring cable connected to the second wiring part 54 extend to the outside of the wiring portion 7, where the wiring cable connected to the first wiring part 53 is connected to an independent power source for supplying independent power to the power supply board 2, the isolating switch 8, the signal processing board 4, etc. As shown in FIG. 9, the third wiring part 55 and the fourth wiring part 56 can be adjacent to the operating portion 6. The wiring cable connected to the third wiring part 55 and the wiring cable connected to the fourth wiring part 56 are connected to a relay to control the operation of the isolating switch 8. As shown in FIG. 5, the sampling interface 57 can be adjacent to the operating portion 6. The sampling interface 57 includes three interfaces, and the three interfaces are connected to a first contact 81 connected to the first line-incoming end 711, a second contact 82 connected to the second line-incoming end 712, and a third contact 83 connected to the third line-incoming end 713, respectively, for monitoring the value of the incoming line voltage.

Referring back to FIGS. 2 to 3, the operating portion 6 is disposed on the human-machine interface board 9, and the operating portion 6 is electrically connected to the human-machine interface board 9. In some embodiments, the operating portion 6 may include a rotating button 61 and a display panel 62, etc., where the rotating button 61 and the display panel 62 may be disposed on the human-machine interface board 9. By rotating the rotating button 61, the opening and closing of the isolating switch 8 can be controlled, thereby realizing the opening and closing of the circuit to disconnect the circuit in case of leakage inside the motor starter 100. The display panel 62 may display status information inside the motor starter 200.

The internal layout of the embodiments of the present disclosure can be applied to various motor starters 200, in order to achieve a compact layout and good insulation effect. It should be understood that the internal layout of the embodiments of the present disclosure can also be applied to other electrical components, embodiments of the present disclosure is not limited thereto.

The above has described various embodiments of the present disclosure. The above description is exemplary, not exhaustive, and is not limited to the disclosed embodiments. Without departing from the scope and spirit of the described embodiments, many modifications and changes will be apparent to those of ordinary skill in the field. The choice of terms used herein is intended to best explain the principles, practical applications, or technical improvements in the market of each embodiment, or to enable other ordinary technicians in the field to understand the various embodiments disclosed herein.

What is claimed is:

1. A motor starter, comprising:

a housing comprising a base plate;

a power supply board disposed on the base plate;

a first insulating board covering a side of the power supply board away from the base plate;

a signal processing board disposed on a side of the first insulating board away from the base plate, and a first insulating part is disposed on a side of the signal processing board away from the base plate; and an interface board disposed on a side of the signal processing board away from the base plate, and a second insulating part is disposed on a side of the interface board facing the signal processing board, a second insulating board is disposed on a side of the interface board away from the signal processing board.

2. The motor starter of claim 1, wherein the base plate comprises a heat-dissipating plate.

3. The motor starter of claim 1, wherein the power supply board comprises a first power supply board, a second power supply board and a third power supply board arranged along an extension direction of the first insulating board, and the first power supply board, the second power supply board and the third power supply board are electrically connected to the signal processing board, respectively.

4. The motor starter of claim 3, wherein a connecting hole is disposed on the first insulating board, and a connecting member of the signal processing board passes through the connecting hole and is electrically connected to the first power supply board, the second power supply board and the third power supply board, respectively.

5. The motor starter of claim 3, wherein third insulating parts are disposed on a side of the first power supply board adjacent to the second power supply board, a side of the second power supply board adjacent to the third power supply board, and a side of the third power supply board away from the second power supply board, respectively.

6. The motor starter of claim 1, wherein the housing further comprises a top plate disposed opposite to the base plate and a first side plate and a second side plate disposed opposite to each other between the base plate and the top plate, and the base plate, the top plate, the first side plate and the second side plate enclose a mounting cavity, the motor starter further comprises an operating portion and a wiring portion, wherein the operating portion and the wiring portion are disposed at both ends of the mounting cavity, respectively.

7. The motor starter of claim 6, wherein vents are disposed on the first side plate and the second side plate, respectively, and the power supply board, the first insulating board, the signal processing board and the interface board are arranged sequentially along a direction from the base plate to the top plate.

8. The motor starter of claim 7, wherein the base plate and the top plate are perpendicular to the first side plate, respectively.

9. The motor starter of claim 6, wherein the motor starter further comprises an isolating switch located within the mounting cavity and adjacent to the operating portion, the wiring portion comprises a line-incoming end and a line-outgoing end, the line-incoming end is electrically connected to the isolating switch, the isolating switch is electrically connected to the power supply board, and the power supply board is electrically connected to the line-outgoing end.

10. The motor starter according to claim 9, wherein the motor starter further comprises a human-machine interface board located within the mounting cavity and adjacent to the operating portion, the human-machine interface board is closer to the operating portion relative to the isolating switch, and the human-machine interface board is electrically connected to the operating portion.

* * * * *